(12) United States Patent
 Miller et al.

(10) Patent No.: US 12,554,889 B2
(45) Date of Patent: Feb. 17, 2026

(54) FRAMEWORK FOR EXPOSING CONTEXT-DRIVEN SERVICES WITHIN A WEB BROWSER

(71) Applicant: Microsoft Technology Licensing, LLC, Redmond, WA (US)

(72) Inventors: Kyle Matthew Miller, Lynnwood, WA (US); Christopher Andrew Evans, Clinton, WA (US); Yufei Zhong, Woodinville, WA (US); Hariharan Ragunathan, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 583 days.

(21) Appl. No.: 17/660,250

(22) Filed: Apr. 22, 2022

(65) Prior Publication Data

US 2023/0222245 A1    Jul. 13, 2023

Related U.S. Application Data

(60) Provisional application No. 63/297,395, filed on Jan. 7, 2022.

(51) Int. Cl.
 *G06F 21/62*  (2013.01)
 *G06F 16/958*  (2019.01)
 *G06F 40/295*  (2020.01)

(52) U.S. Cl.
 CPC ........ *G06F 21/6263* (2013.01); *G06F 16/986* (2019.01); *G06F 40/295* (2020.01)

(58) Field of Classification Search
 None
 See application file for complete search history.

(56) References Cited

U.S. PATENT DOCUMENTS

| | | | | |
|---|---|---|---|---|
| 8,589,366 B1* | 11/2013 | Younes | ................. | G06F 16/951 |
| | | | | 707/602 |
| 11,314,841 B1* | 4/2022 | Montgomery | .......... | H04L 67/55 |
| 2010/0169364 A1* | 7/2010 | Hardt | ...................... | G06F 16/95 |
| | | | | 707/769 |
| 2013/0191723 A1 | 7/2013 | Pappas et al. | | |
| 2014/0304227 A1* | 10/2014 | Taylor | ..................... | G06F 16/84 |
| | | | | 707/661 |

(Continued)

OTHER PUBLICATIONS

"International Search Report and Written Opinion Issued in PCT Application No. PCT/US22/047958", Mailed Date: Feb. 8, 2023, 15 Pages.

(Continued)

*Primary Examiner* — Bassam A Noaman

(57) ABSTRACT

Systems and methods for securely exposing context-driven services within a web browser. An example method includes receiving manifests from hubs apps (e.g., remote services). The manifests define requested context types for the hub apps. When the web browser loads a web page, the web browser may execute context extractors to extract context from the web page. The context extractors that are executed are based on the context types requested by the hub apps. The extracted context is then sent to the corresponding hub apps without providing the hub apps direct access to the web page. For instance, the hub apps do not have access to the document object model (DOM) of the web page and the hub apps cannot inject data into the web page.

20 Claims, 9 Drawing Sheets

(56) References Cited

U.S. PATENT DOCUMENTS

| | | |
|---|---|---|
| 2018/0203839 A1* | 7/2018 | Myren .................. G06F 40/186 |
| 2020/0250372 A1* | 8/2020 | Remington ............. G06F 9/452 |
| 2020/0349215 A1 | 11/2020 | Mcmurray et al. |
| 2021/0326338 A1 | 10/2021 | Alison et al. |

OTHER PUBLICATIONS

"Feature: CSP: Embedded Enforcement", Retrieved from: https://web.archive.org/web/20170717152617/https://chromestatus.com/feature/5750241810710528, Jul. 2017, 1 Page.

"Desktop Screen Resolution Stats Worldwide", Retrieved from: https://web.archive.org/web/20220408205239/https://gs.statcounter.com/screen-resolution-stats/desktop/worldwide/, Apr. 8, 2022, 5 Pages.

Communication pursuant to Article 94(3) EPC, Received in European Patent Application No. 22803441.9, mailed on Oct. 16, 2025, 10 pages.

Examination Report Received in Indian Patent Application No. 202417051777, mailed on Dec. 11, 2025, 07 pages.

* cited by examiner

320 

```
┌─────────────────────────────┐
│     GENERATE MANIFEST       │
│            322              │
└─────────────┬───────────────┘
              ▼
┌─────────────────────────────┐
│  RECEIVE CONTEXT DATA FROM  │
│  BROWSER FOR FIRST WEB PAGE │
│            324              │
└─────────────┬───────────────┘
              ▼
┌─────────────────────────────┐
│ PROCESS CONTEXT DATA RECEIVED│
│        FROM BROWSER         │
│            326              │
└─────────────┬───────────────┘
              ▼
┌─────────────────────────────┐
│ GENERATE HUB APP DATA AND/OR│
│        NOTIFICATIONS        │
│            328              │
└─────────────┬───────────────┘
              ▼
┌─────────────────────────────┐
│  RECEIVE CONTEXT DATA FROM  │
│ BROWSER FOR SECOND WEB PAGE │
│            330              │
└─────────────┬───────────────┘
              ▼
┌─────────────────────────────┐
│ PROCESS CONTEXT DATA RECEIVED│
│        FROM BROWSER         │
│            332              │
└─────────────┬───────────────┘
              ▼
┌─────────────────────────────┐
│ GENERATE HUB APP DATA AND/OR│
│        NOTIFICATIONS        │
│            334              │
└─────────────────────────────┘
```

FIG. 3B

FRAMEWORK FOR EXPOSING CONTEXT-DRIVEN SERVICES WITHIN A WEB BROWSER

CROSS-REFERENCE TO RELATED APPLICATIONS

This application claims priory of U.S. Provisional Application No. 63/297,395, filed Jan. 7, 2022, entitled "FRAMEWORK FOR EXPOSING CONTEXT-DRIVEN SERVICES WITHIN A WEB BROWSER," which is incorporated herein by reference in its entirety.

BACKGROUND

Web browsers are computing applications that provide access to the World Wide Web via the Internet. When a user requests a web page from a particular website, such as by sending a request with a Uniform Resource Locator (URL), the web browser retrieves the related content from a web server and displays the web page on the user's device. For instance, when the content is received from the web server, a rendering engine displays the content on a display of a computing device.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

The present technology relates to systems and methods that implement a framework for exposing context-driven services within a web browser. The present framework allows for remote applications or services, referred to herein as "hub apps," to receive a limited and specialized amount of data from the web browser regarding the web pages being displayed by the web browser. For example, rather than providing the hubs apps with the entire content of the web page and allowing direct interaction with the web page by the hub apps, the present framework provides context about the web page to the hub apps rather than the content itself. The context of the web page is extracted from the web page through the execution of one or more context extractors of the web browser, which may include machine learning (ML) models or other algorithms that extract context from a web page. As a result, the web browser itself is able to control the data that is provided to the hub apps, while the hub apps themselves may execute remotely from the web browser.

The hub apps and their related data may be displayed through a user interface of the web browser that allows for concurrent use of the hub apps without significant interference with the primary web browsing experience of the browser. For example, a web browser may include a sidebar that includes a plurality of icons corresponding to different hub apps. When an icon is selected, a pane may expand from the sidebar, and that pane is populated with data from the selected hub app. Notification indicators for the respective hub apps may also be displayed within the sidebar to provide minimal intrusion to the primary web browsing experience.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings:

FIG. 3B depicts another example method for utilizing the framework for exposing context-driven services within a web browser.

DETAILED DESCRIPTION

Figure 1:
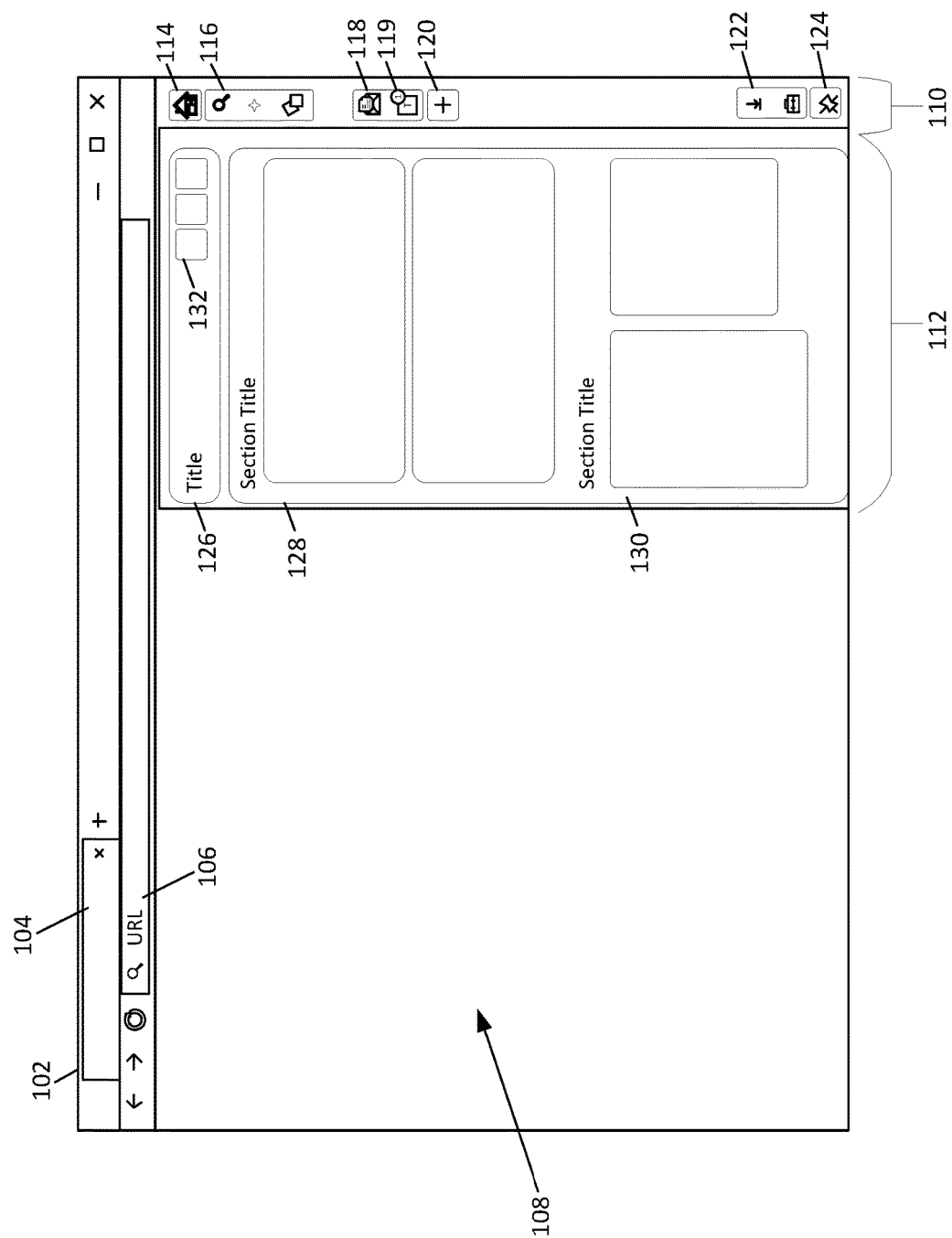
FIG. 1 depicts an example web browser with a sidebar hub.

The following detailed description refers to the accompanying drawings. Wherever possible, the same reference numbers are used in the drawing and the following description to refer to the same or similar elements. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the technology, but instead, the proper scope of the technology is defined by the appended claims. Examples may take the form of a hardware implementation, or an entirely software implementation, or an implementation combining software and hardware aspects. The following detailed description is, therefore, not to be taken in a limiting sense.

As briefly discussed above, a web browser retrieves content such as web pages from the World Wide Web and displays that content within the web browser. A user may interact with that web page and navigate to other web pages or content through interactions with the browser. Recently, web browser plugins and extensions have become available. Such plugins or extensions are small software modules that, when executed, may be configured to interact with the web pages. The extensions, however, are generally provided with the entire web page content and may be able to actually change display of the webpage, such as by changing the document object model (DOM) of the webpage, injecting JavaScript code, etc. The extensions may also interact with the web page by inserting data into the web page, such as automatically filling form data. Thus, the plugins and extensions are given a large amount of access to web pages to which a user navigates, which increases potential privacy and security risks for the user and requires redundant computing resources for each different extension that is run for a webpage.

The present technology, among other things, addresses the above drawbacks of extensions and plugins by introducing a framework that allows for remote applications or services, referred to herein as "hub apps," to receive a limited and specialized amount of data from the web browser regarding the web pages being displayed by the web browser. For example, rather than providing the hubs apps with the entire content of the web page and allowing direct interaction with the web page by the hub apps, the present technology provides context about the web page to the hub apps rather than the content itself. The context of the web page is extracted from the web page through the execution of one or more context extractors of the web browser, which may include machine learning (ML) models or other algorithms that extract context from a web page. As a result, the web browser itself is able to control the data that is provided to the hub apps, while the hub apps themselves may execute remotely from the web browser.

FIG. 1 depicts an example web browser 102 with a sidebar 110 for exposing context-driven services or applications, which may be referred to herein as hub apps. The web browser 102 includes several standard features of web browsers, such as a tab indicator 104 that indicates a particular web page that is being displayed. The web browser 102 also includes a search or URL bar 106 that includes the current URL of the web page that is being displayed by the web browser 102. Other user interface elements, such as a back, forward, and reload button are also presented by the web browser 102. The web browser 102 displays the webpage in a main browsing frame or primary display area 108.

The web browser 102 also includes a sidebar 110 that provides a plurality of icons corresponding to different features and functionalities of the web browser 102. When an icon is selected from the sidebar 110, a hub shell 112 is activated and displays content associated with the application or service corresponding to the selected icon. The hub shell 112 may be a user interface pane that may expand out from the sidebar 110 when an icon is selected. The user interface pane of the hub shell 112 may be provided as an overlay in front of the primary display area 108. For instance, the hub shell may at least partially occlude a web page displayed in the primary display area 108. In other examples, activation of the hub shell 112 may cause the primary display area 108 to shrink in the horizontal direction such that the hub shell 112 does not occlude web pages displayed in the primary display area 108. When an icon is deselected, or a collapse input is received, the hub shell 112 collapses or minimizes such that it is no longer displayed by the web browser 102.

The hub shell 112 may include a hub header 126 that may display a title or other header information of the service and/or application corresponding to the selected icon. The hub header 126 may also include one or more selectable icons corresponding to hub tools 132. The hub tools 132 may include different services, capabilities, and/or functionality that are associated with the service and/or application corresponding to the selected icon. The first section 128 and the second section 130 display hub content associated with and/or received from the service and/or application corresponding to the selected icon. While the hub shell 112 and the sidebar 110 are shown as being on the right-hand side of the browser 102, they may be positioned in different locations of the browser 102 in other examples of the present technology.

The icons of the sidebar 110 may correspond to a variety of different functionalities. For instance, one icon may correspond to a sidebar home 114. Another subset of icons may correspond to different hub services 116 and/or hub apps 118. Additional icons may be presented for browser utilities 122. A docking icon 124 may also be presented in the sidebar 110.

The sidebar home 114, when selected, causes the hub shell 112 to populate with data generally relating to the browsing experience or a collection of data from the hub apps. For example, the hub shell 112 may be populated with recent tab groups for the web browser 102, widgets of the web browser 102, suggested web sites for the user, and/or a search bar, among other features. The hub shell 112 may also include a collection of recent messages and/or notifications associated with the hub apps registered with the web browser, which may include the hub apps having corresponding icons in the sidebar 110. Selection of the sidebar home 114 may also provide for additional configurations or settings for the sidebar 110 along with one or more recommended hub apps, e.g., based on prior browsing history of the user.

The hub services 116 may correspond to services provided by the web browser 102 or from a remote service, such as a search service, a collections service, a discover service, and/or a shopping service among others. The collections service may be a service that allows for a user to collect web page by adding them to a "collection." For instance, multiple collections may be defined by a user, and web pages may be added to each collection. When the collections service icon is selected, the hub shell 112 is populated with the data for the collections associated with the user signed into the web browser 102. For instance, the hub header 126 may be populated with a title of "Collections," the first section 128 may be populated with web pages in a first collection of the user, and the second section 130 may be populated with web pages in a second collection of the user.

As discussed further herein, the web browser 102 may provide context about the web page being displayed in the primary display area 108 to one or more the hub services 116 and/or hub apps 118, without providing the entirety of the actual web page itself to the hub services 116 and/or hub apps 118. The hub services 116 and/or hub apps 118 may then process that context data and generate responsive data for the browser 102 based on the context generated from the web browser 102.

As an illustrative example, when a shopping service icon is selected from the sidebar 110, the hub shell 112 is populated with data from the corresponding shopping service. For instance, the hub header 126 may be populated with the name or title of the shopping service. The data from the shopping service may be based on context of the web page being displayed in the primary display area 108. As an example, the web page may be a product page of a retailer for a particular product, such as headphones. The product name and/or model may be extracted as context by a context extractor of the web browser 102. That context (e.g., headphones name and/or model) may be provided to the shopping service by the web browser 102. The shopping service may then use that context information to generate additional data. In this example, the shopping service may identify other web pages or retailers selling the same product (e.g., other retailers selling the same headphones). The shopping service may also determine price history and/or identify coupons available for the headphones at one or more retailers. That additional data may be communicated back to the web browser from the shopping service and displayed within the hub shell 112. For example, the first section 128 may provide data about products from different retailers, and the second section 130 may provide price history data.

As another example, when a discovery service or tool is selected, context from the web page being displayed in the primary display area 108 is extracted by the web browser 102 and provided in the discovery service. The discovery service uses the context to identify data related to the context received. For example, the discovery service may identify related files (e.g., files in cloud-storage) and/or related conversations (e.g., conversations in a collaboration application, such as the Microsoft Teams collaboration application).

The hub apps 118 may include different applications that are registered with the web browser 102. For example, a mail application (such as the Microsoft Outlook application) and a collaboration application (such as a Microsoft Teams application) may be registered as a hub apps with the web browser 102. The hub apps 118 may function substantially similar to the hub services 116. For instance, the hub apps 118 may receive context from the web browser, and data received from the hub apps 118 may be displayed in the hub shell 112 when the corresponding icons are selected.

As an example, when the mail application icon is selected, the hub shell 112 is populated with data from the mail application. For example, the hub shell 112 may be populated with e-mail and/or calendaring data for the user. As another example, when the collaboration application icon is selected, the hub shell 112 may be populated with messages that have been received and/or sent by the user, such as a conversation between the user and other users. The user may then be able to interact with the application directly through the hub shell 112. For instance, the user may be able to send messages or contribute to a conversation occurring in the collaboration application without having to leave the web browser 102 or even navigate to a different web page in the primary display area 108.

Data received from the hub apps 118 and/or hub services 116 may also be displayed or conveyed in other manners other than in the hub shell 112. For example, the hub apps 118 and/or hub services 116 may send notifications to the browser 102. A notification indicator 119 may then be displayed in the sidebar 110 associated with the hub app 118 or hub service 116 from which the notification was received. For instance, in the example depicted in FIG. 1, a notification has been received by the web browser 102 from the collaboration application (e.g., the Teams hub app). Accordingly, the web browser 102 displays a notification indicator 119. The notification indicator 119 may indicate the presence of a notification and the number of notifications from the respective hub app 118 or hub service 116.

A new hub app 118 and/or hub service 120 may be added to the web browser 102 via selection of add hub app icon 120. Upon selection, a number of available hub apps 118 and/or hub services 116 for adding to the web browser may be displayed. The user may then select the ones that the user wishes to add, and such hub apps 118 and/or services 116 are then registered with the web browser and corresponding icons are added to the sidebar 110.

The browser utilities 122 may include utility functions, such as downloads, favorites, bookmarks, browsing history, etc. When one of the browser utilities icons is selected, data from the corresponding utility function is displayed within the hub shell 112. For instance, if the downloads utility is selected, the previous and/or current downloads are displayed in the hub shell 112. The browser utilities 122 may be characterized by functionality that is considered universal to most browsers.

Selection of the docking icon 124 toggles docking of the hub shell 112. When the hub shell 112 is docked, the hub shell 112 may not overlap the primary display area 108 (e.g., the primary display area 108 shrinks horizontally such that the hub shell 112 and the primary display area 108 are displayed concurrently). When the hub shell 112 is undocked, the hub shell 112 overlaps or occludes the primary display area 108 and when a hub app icon is deselected, the hub shell 112 slides away such that the hub shell 112 is no longer displayed.

Figure 2:
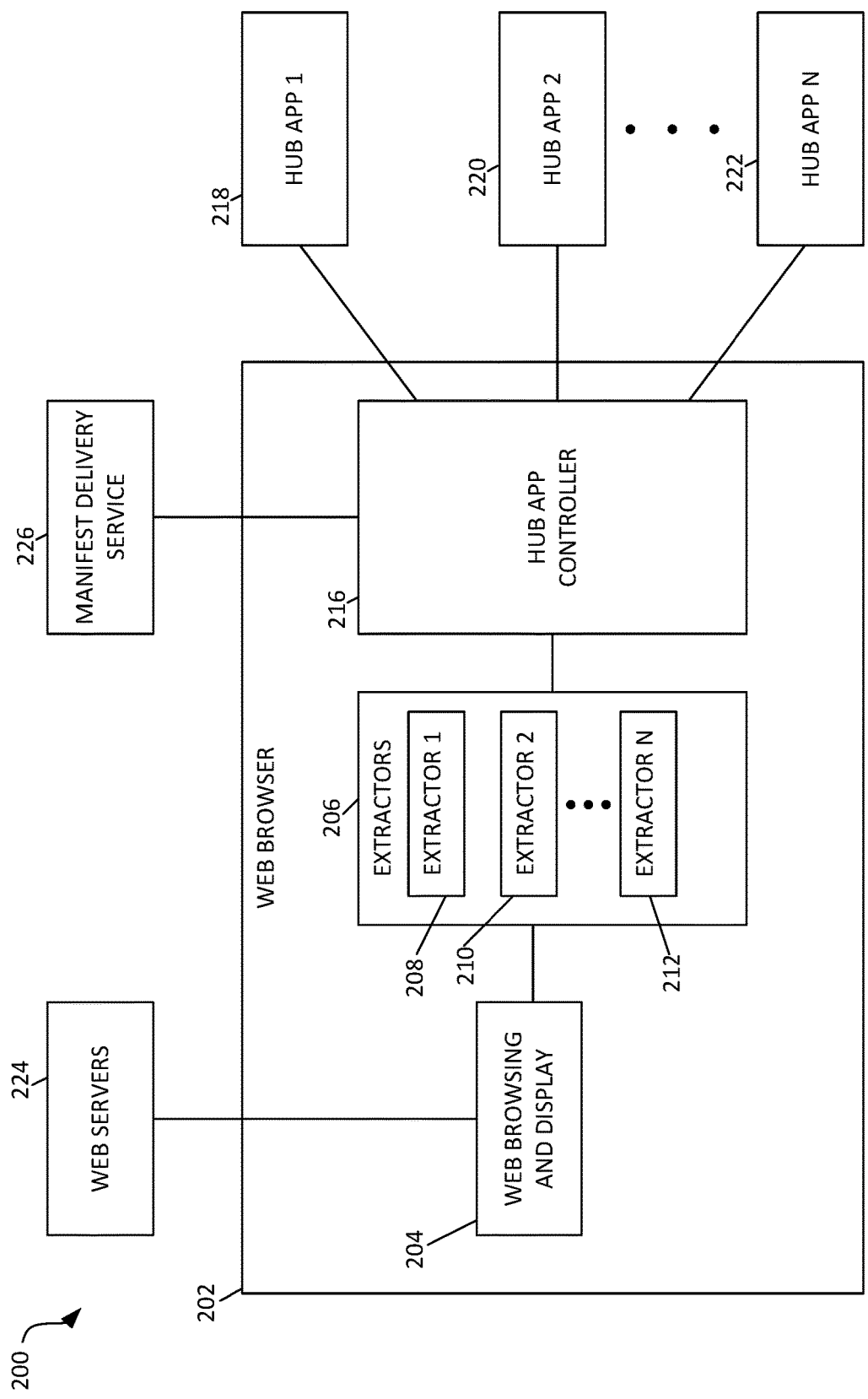
FIG. 2 depicts an example system for implementing the framework for exposing context-driven services within a web browser.

FIG. 2 depicts an example system 200 for implementing the framework for exposing context-driven services within a web browser 202. The web browser 202 includes web browsing and display functionality 204 that controls the retrieval and display of web pages from remote sources, such as web servers 224. For instance, as discussed above, when a web page is requested via a URL, the web browsing and display functionality 204 receives the web page content from a web server 224 and displays the content in the web browser 202.

The web browser 202 also includes one or more context extractors 206 that extract context from the web pages that are displayed by the web browser 202. The context extractors 206 may be algorithms and/or ML models configured to extract different types of context from the web pages. Each of the context extractors 206 may be configured to extract a different type of context from the web page. For instance, the context extractors 206 may include a first context extractor 208 that extracts a first type of context from the web page, a second context extractor 210 that extracts a second type of context from the web page, and additional context extractors through an nth context extractor 212 to extract an nth type of context from the web page.

As an example, the first context extractor 208 may be an ML model configured to extract entities from the web page. For instance, text corresponding to entities may be extracted from the web page and categorized and/or classified according to the ML model and/or through named entity recognition (NER) algorithms. In some examples, the ML models may include Open Neural Network Exchange (ONNX) ML models or the like. Such entities may be extracted from the text of the web page as well as images on the web page. The extracted entities and/or their classifications/categorizations are a type of context. In some examples, multiple context extractors 206 may be configured for different types of entity extractions. For instance, the first context extractor 208 may extract entities for a first type or domain and a second context extractor 210 may extract entities for a second type or domain. Such different types of entities may be considered different context types in some examples.

Other types of context may also be extracted from the web page. For example, an nth context extractor 212 may be a smart find-in-page algorithm that executes a preconfigured query against the web page when, or shortly after, the webpage is loaded to generate results to the query. The smart find-in-page algorithm may be configured with default search terms or configured with search terms received from one or more hub apps 218-222 when the hub app(s) 218-222 register with the web browser. Other context types may be based on user segmentation, browser history, cookies, regular expression (regex) queries, image content recognizers (e.g., objects recognized in images), video context recognizers (e.g., text from subtitles, objects recognized in video), and/or other data extracted from the web page and/or the user profile.

The web browser 102 also includes a hub app controller 216 that controls the registration of the hub apps 218-222 and the exchange of data between the hub apps 218-222 and the web browser 202. The hub app controller 216 may be a set or subset of computing code that causes or controls some of the operations discussed herein relating to communication between the web browser 202 and the hub apps 218-222. The hub app controller 216 and/or the hub apps 218-222 may be shared across multiple windows or instances of the browser 202 having the same user profile (e.g., same user signed into the browser) or, in other examples, the hub apps 218-222 may be different across the multiple windows.

The hub apps 218-222 may include a first hub app 218, a second hub app 220, and a number of other hub apps including an nth hub app 222. While the term hub app is used, the corresponding functionality of each of the hub apps may be that of a service or application and is inclusive of the hub apps and hub services discussed above with respect to FIG. 1. The hub apps 218-222 may operate remotely from the device on which the web browser 202 operates. For instance, the hub apps 218-222 may be hosted by a server or web server and be accessed by a URL request, similar to the retrieval of website. In some examples, one or more of the hub apps 218-222 are web pages that are hosted in a special hosting view provided by the hub app controller 216 of the web browser 202, and those hub apps 218-222 provide experiences that are contextual to the web page in the primary display area of the web browser. Because the hub apps 218-222 may run on a remote server (e.g., provide cloud-based services), new hub apps or changes to the hub apps 218-22 may be built, deployed, and/or changed independently of the web browser 202 itself. In other examples, one or more of the hub apps 218-222 may operate locally on the same device on which the web browser 202 operates but still outside of the web browser 202 itself.

In some examples, the hub apps 218-222 are only accessible through the use of, and interaction with, the hub app controller 216. For instance, attempts to retrieve the hub apps 218-222 via a URL request through the primary display area or search bar of the browser 202 would be unsuccessful. Accordingly, while the hub apps are similar to websites in that they may provide a remote service accessible via a URL, the hub apps operate more similarly to applications than websites from the perspective of the user. For example, because the hub apps are displayed within a hub shell or similar interface, certain browser features do not work in the hub shell or are not available as they would be in the primary display area. For instance, browser extensions may not be allowed to interact with the hub apps or data displayed in the hub shell, so features such as third-party password managers may be prevented from interacting with the hub apps. The address bar for the primary viewing area also does not work with the hub shell, and the hub shell itself may not include a separate address bar for navigating the web within the hub shell.

The hub app controller 216 may control the data exchange and registration of the hub apps 218-222 through the use of configuration data or manifests. A manifest may be provided by a hub app when the hub app initiates registration with the browser 202. The manifest may be a file or set of code, such as .json file. The manifest may include data about the hub app as well as the types of data or context that the hub app would like (e.g., requests) to receive from the web browser 202. The manifest may include data items such as the name of the hub app, an icon for the hub app (e.g., for display in the sidebar), a load URL for the hub app (e.g., a URL from where data is to be received or loaded by the hub app controller 216), a content security policy, and/or other information about the hub app itself.

The manifest may also include the types of context, desired by the hub app, about the web pages loaded by the browser 202. For instance, the manifest may indicate which context extractors 206 should be executed. In some examples, the manifest indicates the desired context types, and the web browser 202 determines which corresponding context extractors should be executed to generate the desired context types.

The manifest may also provide additional data that the hub app requests about the browsing experience in general rather than the specific web page. For instance, the app may request the identity of the user signed into the browser, the browser version, browser features, etc.

The manifest may also include data about the capabilities of the hub app, such as information about any commands that the hub app may need to be added to an interface of the browser (e.g., the hub shell) and how commands are to be passed back to the hub app (e.g., an address and/or data format for the command). The capabilities may also be defined in the manifest as "required" or "optional." In some examples, the web browser 202 may not be able to support all the capabilities of the hub app, and thus the "required" or "optional" definitions for the capabilities are useful for determining whether a hub app is supported. For instance, if the hub app has required capabilities that are not supported by the browser 202, hub apps having such required capabilities may be filtered out or registration of such hub apps will fail or be rejected. Thus, as the hub apps and the web browser 202 may be updated independently of one another, the hub app controller 216 is able to control the interactions between a variety of different combinations of versions.

Based on the details in the manifest, such as the types of context desired by the hub apps, the hub app controller 216 is able to optimize performance of the web browser 202 and optimize interactions with the hub apps to improve performance and security. For instance, the hub app controller 216 is able to reduce unnecessary background code execution, inappropriate access to browser services if a hub app is compromised, and allow different users to see different version of the same hub app to enable better experimentation within hub apps.

The manifests may be handled or managed by a manifest delivery service 226. The manifest delivery service 226 may provide the list of hub app manifests to the browser 202 where the hub app controller 216 may manage the manifests and corresponding hub apps. For instance, the manifest delivery service 226 may be called by the browser 202 to retrieve the appropriate list of hub apps for the particular browser 202 and the signed-in user or profile. The manifest delivery service 226 may then return the list of appropriate hub apps and their manifest entries. The browser 202 may also further refine that list based on user preferences, such as if a user chooses to hide a particular hub app, the order of hub apps displayed in the sidebar, or other similar preferences. The browser 202 may periodically request updates to the manifests by making additional calls to the manifest delivery service.

To improve performance and reduce unnecessary code execution, the hub app controller 216 may control the execution of the context extractors 206 based on the types of the context that have been requested in the manifests of the hub apps. The web browser 202 may have many more context extractors 206 available than are needed for providing the requested context types to the hub apps. In some examples, all of the context extractors 206 may be executed when a new web page is loaded or shortly after the page load. In other examples of the present technology, the number of context extractors 206 that are executed when a web page is loaded may be reduced to only the context extractors 206 that are needed to provide the context types requested by the hub apps. Thus, unnecessary context extractors 206 are not executed, which conserves computing resources and improves overall performance of the web browser 202 and/or the computing device on which the web browser 202 operates.

Once the context extractors 206 that are required to provide the requested context types are identified, the order and timing of execution of those context extractors 206 may be controlled by the hub app controller 216. The timing and order of execution may be based on allowing for efficient loading and display of the web page. For instance, executing context extractors 206 that would slow or interfere with the loading and displaying of the web page may be avoided by delaying their execution to later in an order of execution or after a threshold amount of time. To do so, the context extractors 206 that require the least amount of computing resources may be executed prior to the context extractors 206 that require the most computing resources. This ordering also helps prevent the most computationally expensive context extractors 206 from being executed if the user quickly navigates away from the web page.

In some examples, the context extractors 206, and/or a subset of context extractors 206 that require computing resources exceeding a resource threshold, may be executed after a set duration after a web page is loaded. By delaying the execution of the context extractors 206, computing resources may be conserved in circumstances where a user quickly navigates away from a web page. For example, a user may be presented with a web page and quickly select a link or navigate away from that web page, indicating that the user has little to no interest in that particular web page. As such, context from the web page generated from the context extractors 206 is likely to be similarly uninteresting to the user and may not be generated. The delay in executing the context extractors also help prevent slow down of the page loading process by the browser 202.

Once the context extractors 206 are executed and the corresponding context is generated, the hub app controller 216 sends or pushes the extracted context to the respective hub apps that have requested the context. Accordingly, certain context is provided only to the hub apps that have registered to received that certain context. For example, a first context type may be sent to the first hub app 218 but not to the second hub app 220. Similarly, a second context type may be sent to the second hub app 220 but not to the first hub app 218. In some examples, a context type may be sent to multiple hub apps. For instance, a third context type may be sent the first hub app 218 and the second hub app 220. Providing the context only to those hub apps that need/request the specific context not only improves performance, but also improves security. For instance, by limiting the context that is passed to hub apps and reducing the number of context extractors 206 that are executed, the security surface for potential attacks is also reduced.

The use of the hub app controller 216 also may allow for the hub app functionality to operate across different platforms of the web browser 202, such as on a desktop version and mobile version. While the display of the hub apps may differ between platforms, the functionality may be retained. For instance, communication between the browser 202 and the hub apps may be similarly controlled by the hub app controller 216 on a mobile or desktop version of the browser 202. The hub apps and their configurations/registrations may also be associated with a particular user such that the corresponding hub apps are loaded for the user when the user logs into the web browser 202 on any device or platform.

Context data may be passed to the respective hub apps when it is generated or at other predetermined times. For example, upon startup of the web browser 202 and/or activation of the hub apps, initialization context may be sent to the hub apps. The initialization context may include information such as a current user profile identity, current browser 202 and/or hub app controller 216 version information, and/or optional capabilities that are supported by the browser 202, among other things. This initialization context allows the hub apps to initialize or start with an understanding of the present browser 202 and user. Data about initial interfaces of the browser 202 and callbacks or requests that can be made from the apps may be exchanged between the hub app controller 216 and the hub apps. The interfaces may be sent from the hub apps to the hub app controller 216, and the hub app controller 216 may use those interfaces to send the corresponding context. For instance, the interfaces may indicate how data should be sent to the hub apps and to where the data should be sent.

As discussed above, the hub apps do not have direct access to the web page that is being displayed. The hub app may not have the capability to change the behavior of the primary display area or alter the web pages displayed in the primary display area. For instance, the hub apps cannot access the DOM or change the page load flow. In some examples, however, the hubs are able to send a request through the hub app controller 216 to cause a new window or new tab of the web browser 202 with a new web page. As an example, where the hub app is a shopping app, the shopping app may cause a display in the hub shell of other retailer websites offering the same product. Selection of one of those other retailer websites from the hub shell may cause a new tab or window of the browser 202 to be opened with the corresponding website of the other retailer.

At runtime of the browser 202 (e.g., when the browser 202 is executed and/or a foreground application), the hub apps may run in the foreground or in the background. When the hub apps run in the foreground, the user interface of the hub app is displayed, such as in the hub shell. When the hub apps run in the background, the only visible part of the hub app is its icon and notification state, such as in the sidebar. Even when the hub apps are not displayed in the hub shell, context may still be sent to the hub apps from the hub app controller 216. This enables the hub app to receive context about the current web page and process that context to perform actions, such as changing its notification state by sending a notification to the hub app controller 216 based on the received context.

In some examples, the hub apps 218-222 may communicate with one another via data exchanged with the hub app controller 216. For instance, the first hub app 218 may send data to the hub app controller 216 that is to be passed to the second hub app 220. As such, the communication and sharing of data may be controlled by the hub app controller 216 to prevent unauthorized sharing of data. Thus, communication between the hub apps can effectively be achieved and controlled through a single framework.

As an illustrative example, a user may be shopping for headphones on a first website. A context extractor is executed to generate context about the webpage from which the first hub app 218 (e.g., a shopping hub app) processes the data to determine that the headphones are out of stock on that web page. In addition to offering competitive pricing from other websites or retailers as discussed above, the first hub app 218 may provide the user with a choice of alerting them when the product become available. Such a selectable option may be displayed in hub shell. If the user decides to opt-in to the availability alert from the shipping hub app, a new signal may be created and sent to the hub app controller 216 that can be used by other hub apps, such as the second hub app 220, to offer other services. For example, the second hub app 220 may be an automator hub app that is distinct from the shopping hub app, which can leverage the new signal and the framework to offer automated purchasing of the product when it comes back into stock. Thus, from the single framework, multiple services can work in conjunction with each other and the user's context to enhance experiences from end-to-end.

Figure 3A:
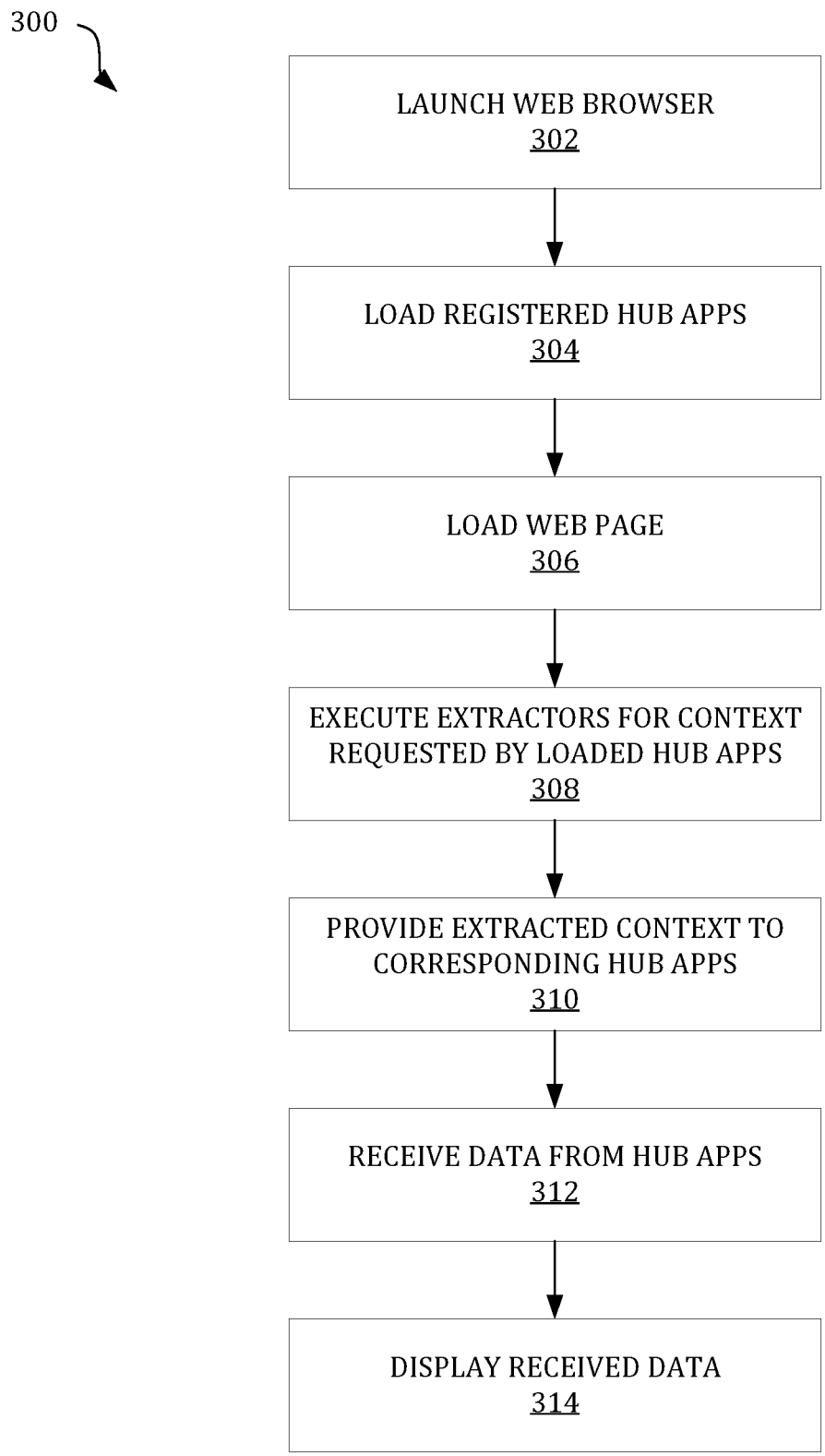
FIG. 3A depicts an example method for utilizing the framework for exposing context-driven services within a web browser.

FIG. 3A depicts an example method 300 for utilizing the framework for exposing context-driven services within a web browser. The operations of method 300 may be performed by a computing device, such as a computing device hosting the web browser. In some examples, the operations are performed by the web browser. At operation 302, a web browser is launched or executed. For instance, the web browser may be launched in response to a user selection of the web browser application.

At operation 304, hub apps registered with the web browser and/or profile of the user signed into the browser are loaded by the web browser. The registered hub apps may include at least a first hub app and a second hub app. Loading the hub apps may include receiving a list of hub apps and their respective manifests from a manifest delivery service. For instance, the configuration data (e.g., manifests) for previously registered hub apps may be received at operation 304. Loading the hub apps may be performed by the hub app controller of the web browser.

Operation 304 may also include updating a user interface of the web browser based on the loaded hub apps. For example, icons for the registered hub apps may be displayed in a sidebar of the web browser. As discussed above, the hub apps may correspond to a remote service (e.g., a service executing on a remote server), and as such, the hub apps may also be referred to as remote services in some examples.

At operation 306, a web page is loaded by the web browser. For example, the web browser may request a web page via the URL for the web page. When the content for the web page is received by the web browser from the web server, the web server displays the content of the web page, such as in a primary display are of the web browser.

At operation 308, one or more context extractors are executed by the web browser to extract context from the loaded web page. The context extractors that are executed may be fewer than all of the available context extractors for the browser. For example, the executed context extractors may be a subset of the available context extractors, and the subset of context extractors may be based on the context types requested. For instance, operation 308 may include first identifying, from a set of available context extractors, a subset of a context extractors corresponding to the context types requested by the first hub app and the context types requested by the second hub app. Then, the identified subset of context extractors is executed to generate context for the web page. For instance, the identified subset of context extractors may include a first context extractor configured to extract a first context having a first context type and a second context extractor configured to extract a second context having a second context type.

As an illustrative example, if the web browser is capable of extracting 30 different context types (e.g., 30 different types of entities) from web pages through execution of 30 different context extractors, but only four context types are required by the hub apps, the browser can avoid running the other 26 context extractors. Similarly, if all the hub apps are looking for same context type, such as product details, the corresponding context extractor may be run once for a web page and the extracted context may be passed to all the hub apps that need it. This is an improvement over having each hub app run an independent context extractor or the browser running the same context extractor multiple times for the same web page.

As discussed above, the context extractors may be executed at different times in different examples. For instance, the context extractors may be executed upon page load or after a predetermined time (e.g., 2-5 seconds) after the page load occurs. It may be preferable that the execution of the context extractors does not interfere with the loading of the page or the user's perceived page load and presentation times. The order of execution of the context extractors may be based on the computing resources required for each of the context extractors. For example, the context extractors that require the most computing resources (e.g., processing cycles, memory usage) may be executed last or after context extractors that require fewer computing resources.

At operation 310, the context for the web page extracted or generated in operation 308 is sent or pushed to the corresponding hub apps. For instance, if the first hub app requested a first context type in its corresponding manifest, the context corresponding to that requested context type is provided to the first hub app. The context is provided to the hub apps via the web browser, and in some examples, by the hub app controller of the web browser. Thus, the context may be provided to the hub apps without providing the hub apps access to the web page itself, such as through access to the DOM of the web page.

Because the hub apps have pre-registered, prior to page load, the context types that they desire, the corresponding extracted context may be automatically pushed to the hub apps without needing a separate request from the hub apps. The push of extracted context may occur whether the hub app is active or in the background, and receipt of the extracted context may cause the hub app to activate.

At operation 312, data from one or more of the hub apps is received. The data may be based on the extracted context sent to the hub apps. For example, the hub apps may receive the context, process the context, and provide responsive data back to the browser. The hub app data may be in the form of notification data and/or substantive data to be displayed in a pane of the browser, such as the hub shell.

At operation 314, the hub app data received in operation 312 is displayed by the web browser. Where the hub app data is a notification, the web browser may display a notification indicator in a sidebar proximate to an icon corresponding to the hub app that provided the notification. Where the hub app data includes substantive data, that data may be displayed in a pane of the web browser, such as in the hub shell.

FIG. 3B depicts another example method 320 for utilizing the framework for exposing context-driven services within a web browser. The example method 320 may be executed by a hub app executing on a device that is remote from the device operating the web browser. At operation 322, a manifest is generated and/or sent to the web browser. The manifest may include the configuration data discussed above, such as the name of the hub app, an icon for the hub app, requested context types, capabilities of the hub app, etc.

At operation 324, context data for a first web page is received from the web browser. The context data may be any of the types of context data discussed above that may be generated through the execution of one or more context extractors. At operation 326, the context data for the first web page is processed. For instance, the context data may be analyzed to determine if any actions need be taken or data generated in response to the received context. At operation 328, data responsive to the received context is generated. The responsive data may be a notification and/or substantive data based on the received context. That responsive data is then sent or provided to the web browser for display in the web browser.

At operation 330, context data for a second web page is received from the web browser. For instance, after a user navigates to a new or second web page or the user switches to a different tab of the web browser causing the second web page to be displayed in the primary display area, the web browser may extract context from that second web page.

In some examples, when a web page for a particular tab loaded and context is generated for the web page, that generated context may be cached (e.g., stored) while the tab continues to exist (e.g., until the tab is closed). Accordingly, when a user navigates from one tab to another tab (or one browser window to another browser window), the context need not be regenerated each time a different tab is selected. When the browser receives an indication to navigate to a second tab from a first tab, the browser then displays the web page (e.g., second web page) of the second tab and may access the cached context. The cached context for the second web page may then be pushed or sent to one or more of the hub apps along with an indication that the tab has changed. Such a process conserves resources by not having to rerun the context extractors upon switching of tabs. In addition, the context may be provided almost immediately upon a switch of a tab as the context has already been generated.

At operation 332, the context data for the second web page is processed and, at operation 334, data responsive to the received context for the second web page (and in some examples the context for the first web page as well) is generated. For example, the hub app may process the context from the first web page and the context from the second web page together to understand a sequence of events or a trend in the web browsing. Operations 332 and 334 may be substantially similar to operations 326 and 328 but based on the context data for the second web page. The responsive data is then sent to the browser for display.

Figure 3C:
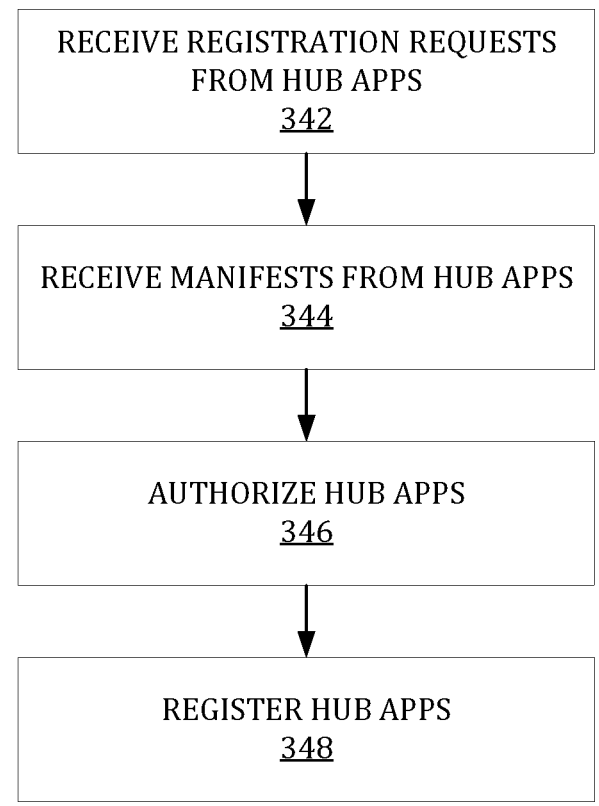
FIG. 3C depicts another example method for utilizing the framework for exposing context-driven services within a web browser.

FIG. 3C depicts another example method 340 for utilizing the framework for exposing context-driven services within a web browser. The operations of the example method 340 may be performed by the web browser and/or a service of the web browser. For instance, some operations of the method 340 may be performed by a hub app controller and/or a manifest delivery service. At operation 342, registration requests from hub apps are received. As an example, a registration request may be received from a first hub app and a second hub app. The registration request may be in response to a user selecting the hub apps for addition to the browser.

At operation 344, manifests for the hub apps are received. For example, a first manifest from the first app may be received and a second manifest from the second hub app may be received. The manifests may include the types of configuration data discussed above, such as the name of the hub app, an icon for the hub app, requested context types, capabilities of the hub app, etc.

At operation 346, the hub apps that meet authorization criteria are authorized. For instance, a determination may be made as to whether the hub app is authorized based on the data in the manifest. The authorization criteria may be based on security certificates or other predefined security requirements. The authorization criteria may also be based on the browser version and capabilities along with user preferences. As an example, if the manifest includes a capability of the hub app that is indicated as being required, but the web browser version does not support such a capability, the hub app will not be authorized for that particular browser.

User preferences may include privacy preferences for context types that a user allows or blocks. For instance, a user may indicate that some context types are not authorized (i.e., are blocked). Such preferences may be entered via a selection screen listing the various context types available from the browser. If a manifest of a hub app includes a context type that a user has blocked, the hub app may not be authorized in operation 346. In other examples, the hub app may still be authorized, but the blocked context times are not provided to the hub app. In some examples, a message is sent to the hub app indicating that one or more of the requested context types will not be provided. When a user has blocked a particular context type, the corresponding context extractor may not be executed for any web pages, which results in conservation of computing resources and also improvements in privacy as the corresponding context is never generated in the first place.

Once the hub apps are authorized in operation 346, the hub apps may be registered with a browser and/or a user profile at operation 348. For example, the hub apps may be registered with the manifest delivery service that maintains a list of the authorized and registered hub apps. The list of registered hub apps may be associated with the user profile of the user that added the particular hub apps. Accordingly, when a user logs into a browser, even on different devices, the list of registered hub apps may be retrieved and incorporated into the respective browser on the device.

Figure 4:
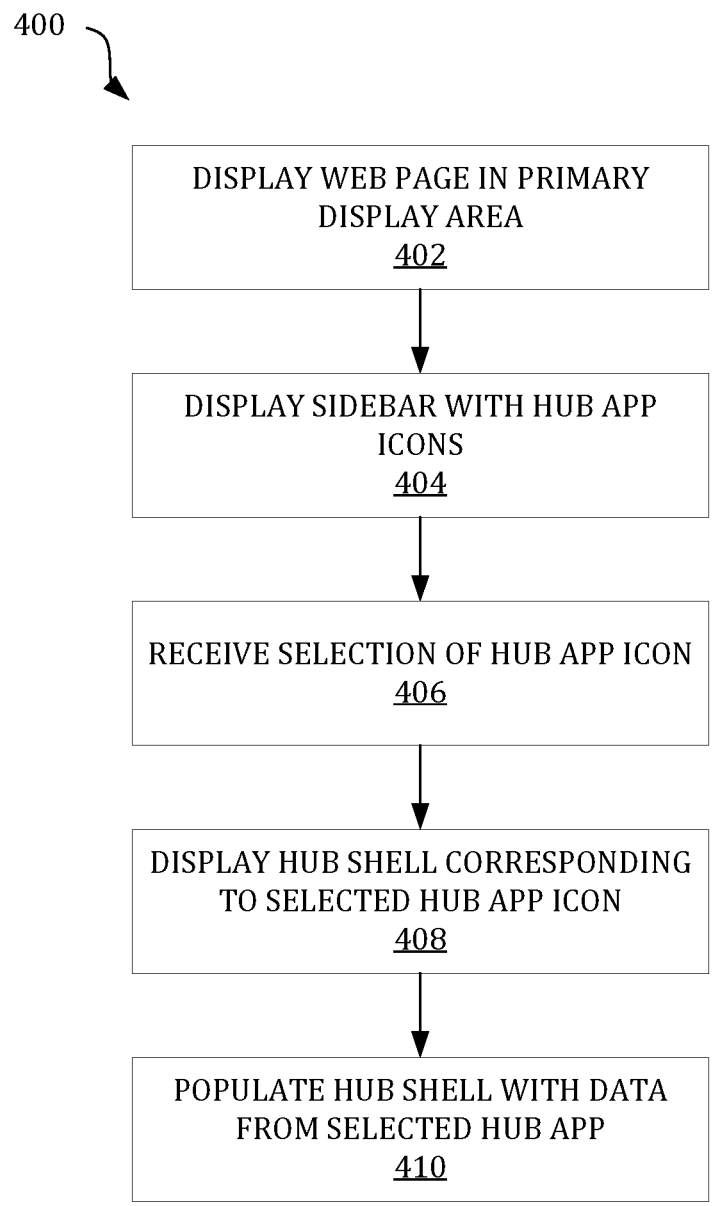
FIG. 4 depicts another example method for utilizing the framework for exposing context-driven services within a web browser.

FIG. 4 depicts another example method 400 for utilizing the framework for exposing context-driven services within a web browser. The operations of method 400 may be implemented by a web browser and/or a device on which the web browser operates.

At operation 402, a web page is displayed in a primary display area of the web browser. At operation 404, a plurality of hub app icons are displayed in a sidebar of the web browser. The sidebar may be displayed on one of the sides of the primary display area and/or at the top or bottom of the primary display area. At operation 406, a selection of one of the hub app icons is received. The selection may be via any input device, such as a cursor and a mouse or a touch input.

In response to receiving the selection of the hub app icon, a hub shell corresponding to the selected hub app icon is displayed in operation 408. At operation 410, the hub shell is populated with data that is received from the selected hub app. The data may be any of the types of data discussed above.

The techniques discussed herein for providing a framework for exposing context-driven services within a web browser allows for significant advantages to be achieved.

For example, by separating the browser code from that of the remote service of the hub app, the features of the service are able to iterate or change at a velocity that is largely independent from that of the browser itself. Accordingly, the features of the service may be able to change more quickly, while the client-side browser changes and versioning may proceed at a more reserved pace to allow for more thorough debugging and security assessments for the browser as a whole. As discussed above, due to the architecture of present framework, security concerns of the hub apps are minimized by not providing the hub apps direct access to the loaded pages or the ability to inject data directly into the web page. In addition, security concerns are also minimized because the hub apps are executed in an isolated context from the rest of the browser and its content.

The particular user interface features discussed herein also provide additional advantages. For instance, the present user interface features may prevent interruptions and popups during a usual workflow of a user. Such pop ups generally require additional interaction from the user and potentially lead to further wastes of computing resources in handling such popups. By enabling notifications within the sidebar and utilizing a user-activated hub shell, the user is provided with the notification that, for example, new information is available without interrupting their workflow with the information itself.

By delivering the manifests of the hub apps from a manifest delivery service, quality issues with updated versions of a browser may be quickly detected. In some examples, a hub app version may be rolled-back or changed to a fixed version very quickly in response—often before a user even realizes there may be a problem. In addition, by having knowledge of the web content running in the hub apps, execution of the hub apps may be isolated to specific render processes so that any failures in the hub app do not impact the reliability of the other web pages or the browser itself. In addition, the use of manifests and the delivery service also allows for delivery of experimental versions of hub apps, which allows for pushing testing abilities to the web browser by passing multiple service URLs in the manifest and allow client flags or other methods to left the web browser decide which of the version of the hub app to use.

Figure 5:
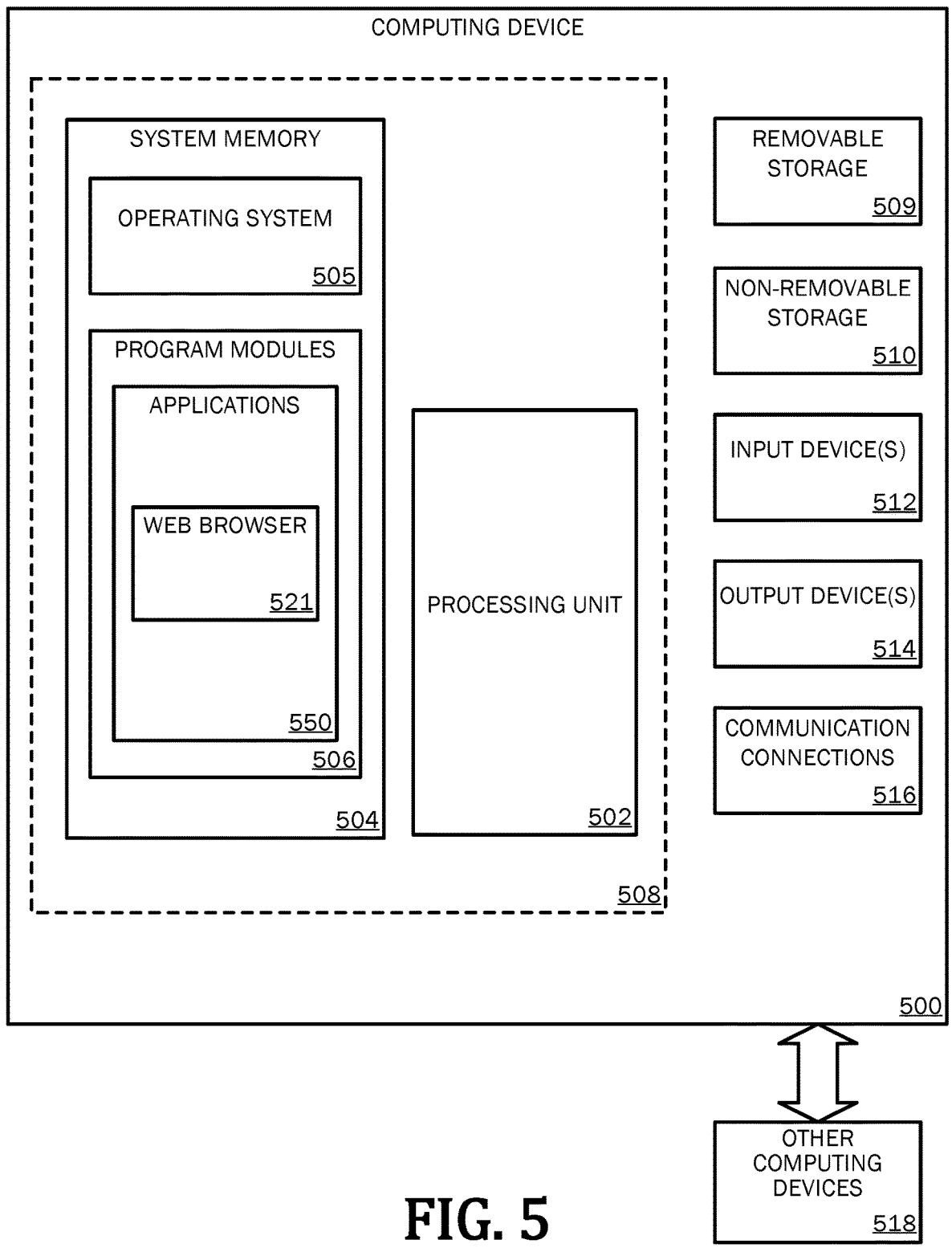
FIG. 5 is a block diagram illustrating example physical components of a computing device with which aspects of the technology may be practiced.

FIGS. 5-6 and the associated descriptions provide a discussion of a variety of operating environments in which examples of the invention may be practiced. However, the devices and systems illustrated and discussed with respect to FIGS. 5-6 are for purposes of example and illustration and are not limiting of a vast number of computing device configurations that may be utilized for practicing aspects of the invention, described herein.

FIG. 5 is a block diagram illustrating physical components (i.e., hardware) of a computing device 500 with which examples of the present disclosure may be practiced. The computing device components described below may be suitable for a client device running the web browser discussed above. In a basic configuration, the computing device 500 may include at least one processing unit 502 and a system memory 504. The processing unit(s) (e.g., processors) may be referred to as a processing system. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 550 such as a web browser 521.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the operations of the methods illustrated in FIGS. 3-4. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
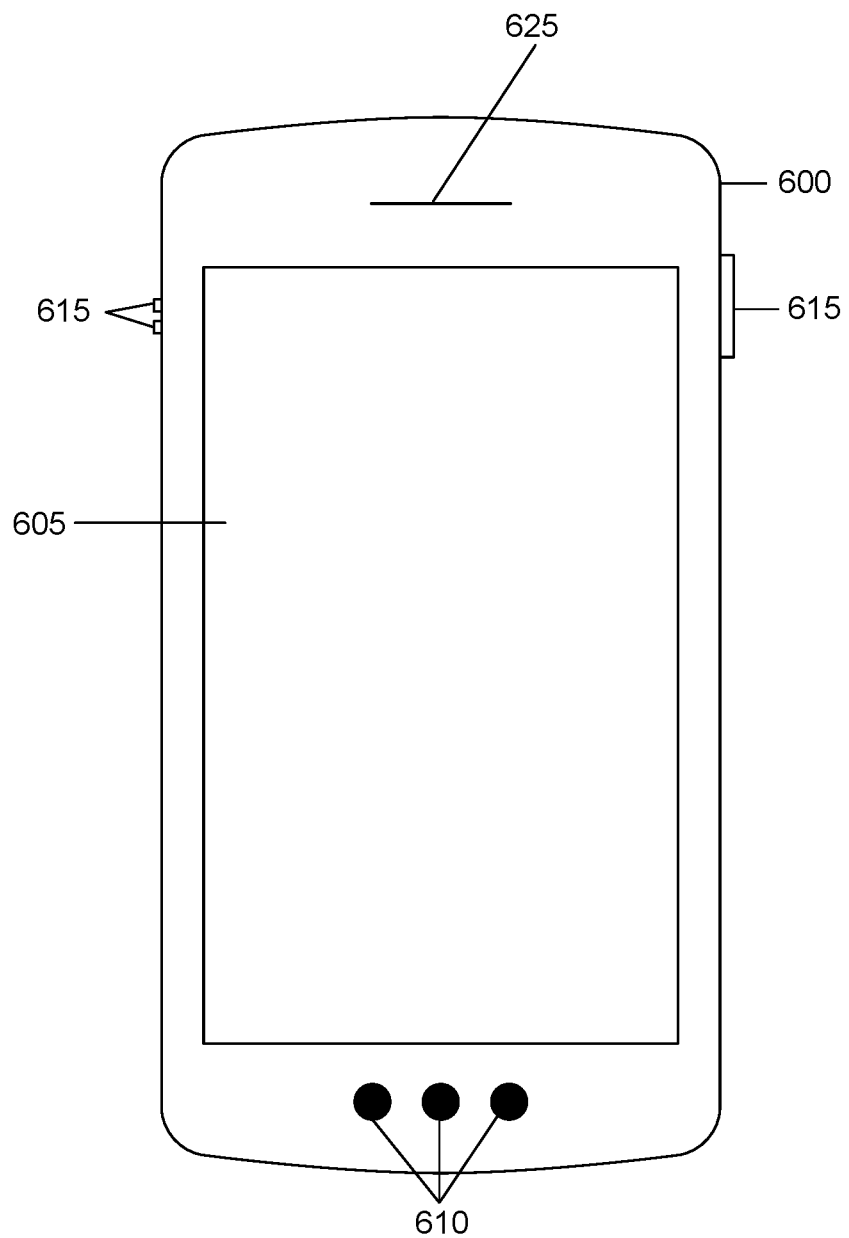
FIGS. 6A and 6B are simplified block diagrams of a mobile computing device with which aspects of the present technology may be practiced.
Figure 6B:
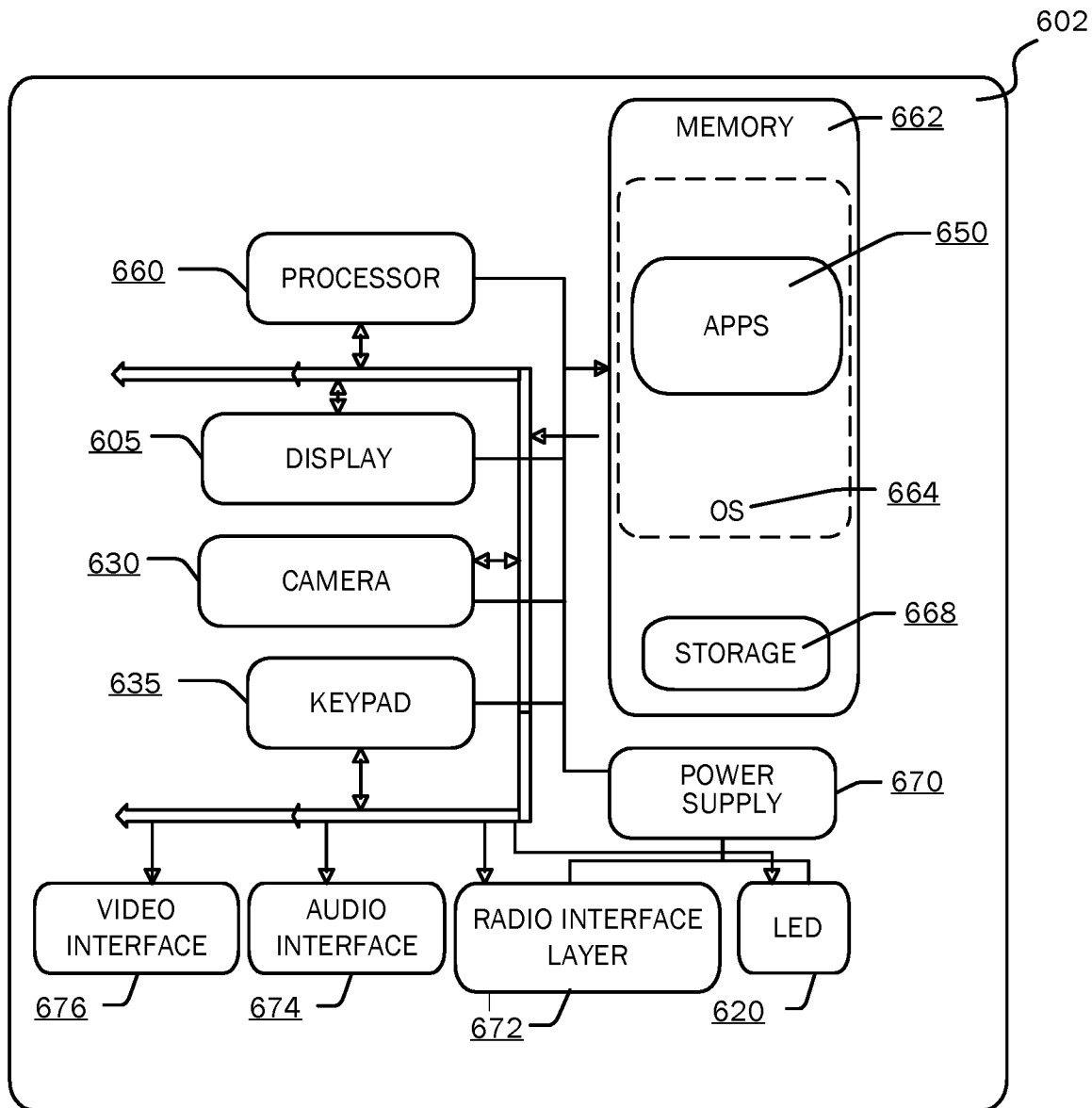

FIGS. 6A and 6B illustrate a mobile computing device 600, for example, a mobile telephone, a smart phone, a tablet personal computer, a laptop computer, and the like, with which aspects of the invention may be practiced. With reference to FIG. 6A, an example of a mobile computing device 600 for implementing at least some aspects of the present technology is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, optional side input elements 615 allows further user input. The side input elements 615 may include buttons, switches, or any other type of manual input elements. In alternative examples, mobile computing device 600 may incorporate more or less input elements. Key input may generally be received from a soft keyboard displayed on the display 605, but in other examples, the mobile computing device 600 may also include an optional physical keypad. Optional keypad 635 may be a physical keypad or a "soft" keypad generated on the touch screen display. One or more audio transducers 625 (e.g., speakers) may also be included. In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and/or a video output for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one example, the system 602 is implemented as a "smart phone" capable of running one or more applications (e.g., videoconference or virtual meeting application, web browser, e-mail, calendaring, contact managers, messaging clients, games, and media clients/players). In some examples, the system 602 is integrated as a computing device, such as an integrated personal digital assistant (PDA) or wireless phone.

One or more application programs 650 may be loaded into the memory 662 and run on or in association with the operating system 664. Examples of the application programs include videoconference or virtual meeting programs, phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 650 may use and store information in the non-volatile storage area 668, such as e-mail or other messages used by an e-mail application, and the like. A synchronization application (not shown) may also reside on the system 602 and is programmed to interact with a corresponding synchronization application resident on a host computer to keep the information stored in the non-volatile storage area 668 synchronized with corresponding information stored at a remote device or server. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

The visual indicator 620 may be used to provide visual notifications and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape.

Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to data/information transfer and storage means, including electronic mail and collaborative data/information sharing systems.

In an aspect, the technology relates to a system for securely exposing context-driven services within a web browser. The system includes a processing system; and memory storing instructions that, when executed by the processing system, cause the system to perform operations. The operations include loading a plurality of registered remote services, the plurality of remote services including a first remote service and a second remote service requesting context types for loaded web pages; loading, by a web browser, a web page; executing a plurality of context extractors based on the context types requested by the plurality of registered remote services to generate a first context for the web page and a second context for the web page; and sending at least one of the first context or the second context to at least one of the first remote service or the second remote service.

In an example, loading the plurality of registered remote services includes receiving configuration data for previously registered remote services, the configuration data including the requested context types for the plurality of remote services. In another example, executing a plurality of context extractors includes identifying, from a set of available context extractors, a subset of a context extractors corresponding to context types requested by the first remote service and context types requested by the second remote service; and executing the identified subset of context extractors to generate the first context and the second context. In a further example, the first context includes entities extracted from the web page. In yet another example, a document object model (DOM) for the web page is not provided to, nor accessible by, the first remote service or the second remote service. In still another example, loading the plurality of remote services includes displaying, in a sidebar of the web browser, a first icon for the first remote service and a second icon for the second remote service.

In another example, the operations further include receiving notification data from the first remote service based on the first context; and displaying a notification indicator proximate the first icon to indicate the received notification data. In yet another example, the first context is sent to the first remote service and the second remote service; and the second context is sent to the second remote service but not the first remote service.

In another aspect, the technology relates to a method for securely exposing context-driven services within a web browser. The method includes receiving a first manifest for a first hub app, the first manifest including a first set of requested context types; receiving a second manifest for a second hub app, the second manifest including a second set of requested context types; loading, by a web browser, a web page; based on the first set of requested context types and the second set of context types, identifying, by the web browser from a set of available context extractors, a subset of a context extractors corresponding to the first set of requested context types and the second set of requested context types; executing, by the web browser, the identified subset of context extractors to generate a first context of the web page and a second context of the web page; and sending at least one of the first context or the second context to at least one of the first hub app or the second hub app.

In an example, the first manifest includes a first icon for the first hub app and the second manifest includes a second icon for the second hub app. In another example, the method further includes displaying, by the web browser, the web page in a primary display area; displaying, by the web browser, the first icon and the second icon in a sidebar; receiving a selection of the first icon; and in response to receiving the selection of the first icon, displaying data from the first hub app, generated in response to the first context, in a user interface pane expanded out from the sidebar. In still another example, the first set of requested context types includes an entity-extraction context type. In yet another example, the first set of requested context types further includes a find-in-page context type, and the manifest includes a search term for a corresponding find-in-page algorithm.

In another example, a document object model (DOM) for the web page is not provided to, or accessible by, first hub app or the second hub app. In still another example, the first hub app and the second hub app cannot cause data input into the loaded web page.

In another aspect, the present technology relates to a method for securely exposing context-driven services within a web browser. The method includes loading, by a web browser, a web page; displaying, by the web browser, the web page in a primary display area of the web browser; loading a plurality of registered remote services, the plurality of remote services including a first remote service and a second remote service; displaying, by the web browser in a sidebar, an icon for the first remote service and an icon for the second remote service; executing a plurality of context extractors based on context types requested by the plurality of registered remote services to generate a first context for the web page and a second context for the web page; sending at least one of the first context or the second context to the first remote service and the second remote service; receiving data from the first remote service; and displaying, by the web browser in a user interface pane expanded out from the sidebar, the received data.

In an example, a document object model (DOM) for the web page is not provided to, or accessible by, the first remote service or the second remote service. In another example, executing a plurality of context extractors includes identifying, from a set of available context extractors, a subset of a context extractors corresponding to context types requested by the first remote service and context types requested by the second remote service; and executing the identified subset of context extractors to generate the first context and the second context. In still another example, the first context includes entities extracted from the web page. In yet another example, the second context is a find-in-page context type. Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A system for securely exposing context-driven services within a web browser, the system comprising:
a processing system; and
memory storing instructions that, when executed by the processing system, cause the system to perform operations comprising:
loading, by a web browser, a plurality of registered remote services that are external to the web browser and execute on one or more devices that are remote from a device that is executing the web browser, the plurality of remote services including a first remote service requesting a first context type for loaded web pages and a second remote service requesting a second context type for loaded web pages;
loading, by the web browser, a web page;
executing, by the web browser, a plurality of context extractors based on the first context type and the second context type to generate a first context for the web page and a second context for the web page, wherein the first context is different from the second context; and
sending at least one of the first context or the second context to at least one of the first remote service or the second remote service.

2. The system of claim 1, wherein loading the plurality of registered remote services includes receiving configuration data for previously registered remote services, the configuration data including the requested context types for the plurality of remote services.

3. The system of claim 1, wherein executing a plurality of context extractors comprises:
identifying, from a set of available context extractors, a subset of a context extractors corresponding to context types requested by the first remote service and context types requested by the second remote service; and
executing the identified subset of context extractors to generate the first context and the second context.

4. The system of claim 1, wherein the first context includes entities extracted from the web page.

5. The system of claim 1, wherein a document object model (DOM) for the web page is not provided to, nor accessible by, the first remote service or the second remote service.

6. The system of claim 1, wherein loading the plurality of remote services includes displaying, in a sidebar of the web browser, a first icon for the first remote service and a second icon for the second remote service.

7. The system of claim 6, wherein the operations further comprise:
receiving notification data from the first remote service based on the first context; and
displaying a notification indicator at the first icon to indicate the received notification data.

8. The system of claim 6, wherein:
the first context is sent to the first remote service and the second remote service; and
the second context is sent to the second remote service but not the first remote service.

9. A method for securely exposing context-driven services within a web browser, the method comprising:
receiving a first manifest for a first hub app, the first manifest including a first set of requested context types that are requested by the first hub app;
receiving a second manifest for a second hub app, the second manifest including a second set of requested context types that are requested by the second hub app;
loading, by a web browser, a web page, wherein the first hub app and the second hub app are external to the web browser;
based on the first set of requested context types and the second set of context types, identifying, by the web browser from a set of available context extractors, a subset of a context extractors corresponding to the first set of requested context types and the second set of requested context types;
executing, by the web browser, the identified subset of context extractors to generate a first context of the web page and a second context of the web page, wherein the first context is different from the second context; and
sending at least one of the first context or the second context to at least one of the first hub app or the second hub app.

10. The method of claim 9, wherein the first manifest includes a first icon for the first hub app and the second manifest includes a second icon for the second hub app.

11. The method of claim 10, further comprising:
displaying, by the web browser, the web page in a primary display area;
displaying, by the web browser, the first icon and the second icon in a sidebar;
receiving a selection of the first icon; and
in response to receiving the selection of the first icon, displaying data from the first hub app, generated in response to the first context, in a user interface pane expanded out from the sidebar.

12. The method of claim 9, wherein the first set of requested context types includes an entity-extraction context type.

13. The method of claim 12, wherein the first set of requested context types further includes a find-in-page context type, and the manifest includes a search term for a corresponding find-in-page algorithm.

14. The method of claim 9, wherein a document object model (DOM) for the web page is not provided to, or accessible by, the first hub app or the second hub app.

15. The method of claim 9, wherein the first hub app and the second hub app cannot cause data input into the loaded web page.

16. A method for securely exposing context-driven services within a web browser, the method comprising:
    loading, by a web browser, a web page;
    displaying, by the web browser, the web page in a primary display area of the web browser;
    loading a plurality of registered remote services that are external to the web browser, the plurality of remote services including a first remote service and a second remote service;
    displaying, by the web browser in a sidebar, an icon for the first remote service and an icon for the second remote service;
    executing a plurality of context extractors based on a plurality of context types requested by the plurality of registered remote services to generate a first context for the web page and a second context for the web page, wherein the first context is different from the second context;
    sending at least one of the first context or the second context to the first remote service and the second remote service;
    receiving data from the first remote service; and
    displaying, by the web browser in a user interface pane expanded out from the sidebar, the received data.

17. The method of claim 16, wherein a document object model (DOM) for the web page is not provided to, or accessible by, the first remote service or the second remote service.

18. The method of claim 16, wherein executing a plurality of context extractors comprises:
    identifying, from a set of available context extractors, a subset of a context extractors corresponding to context types requested by the first remote service and context types requested by the second remote service; and
    executing the identified subset of context extractors to generate the first context and the second context.

19. The method of claim 16, wherein the first context includes entities extracted from the web page.

20. The method of claim 19, wherein the second context is a find-in-page context type.

\* \* \* \* \*